United States Patent Office 3,384,184
Patented May 21, 1968

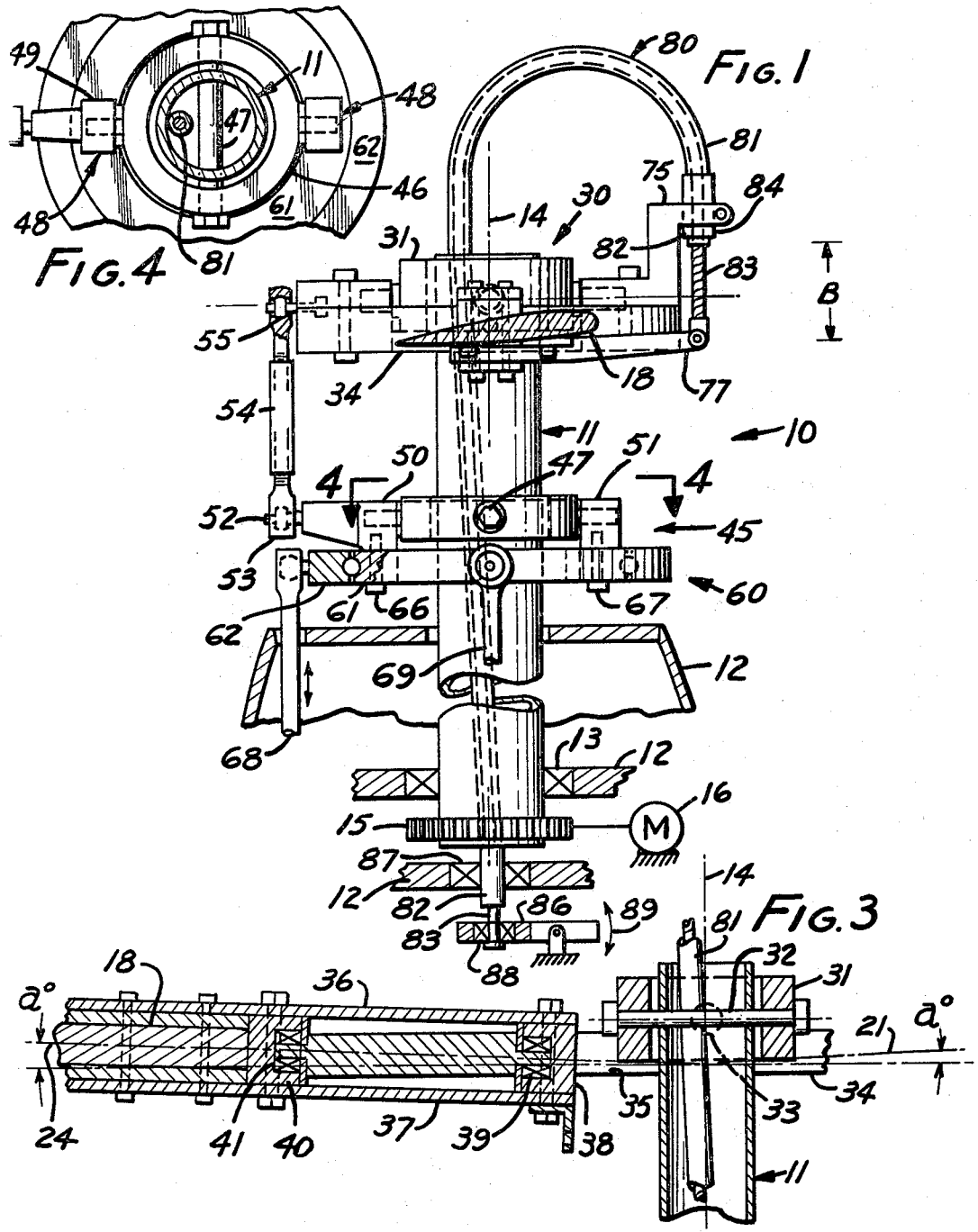

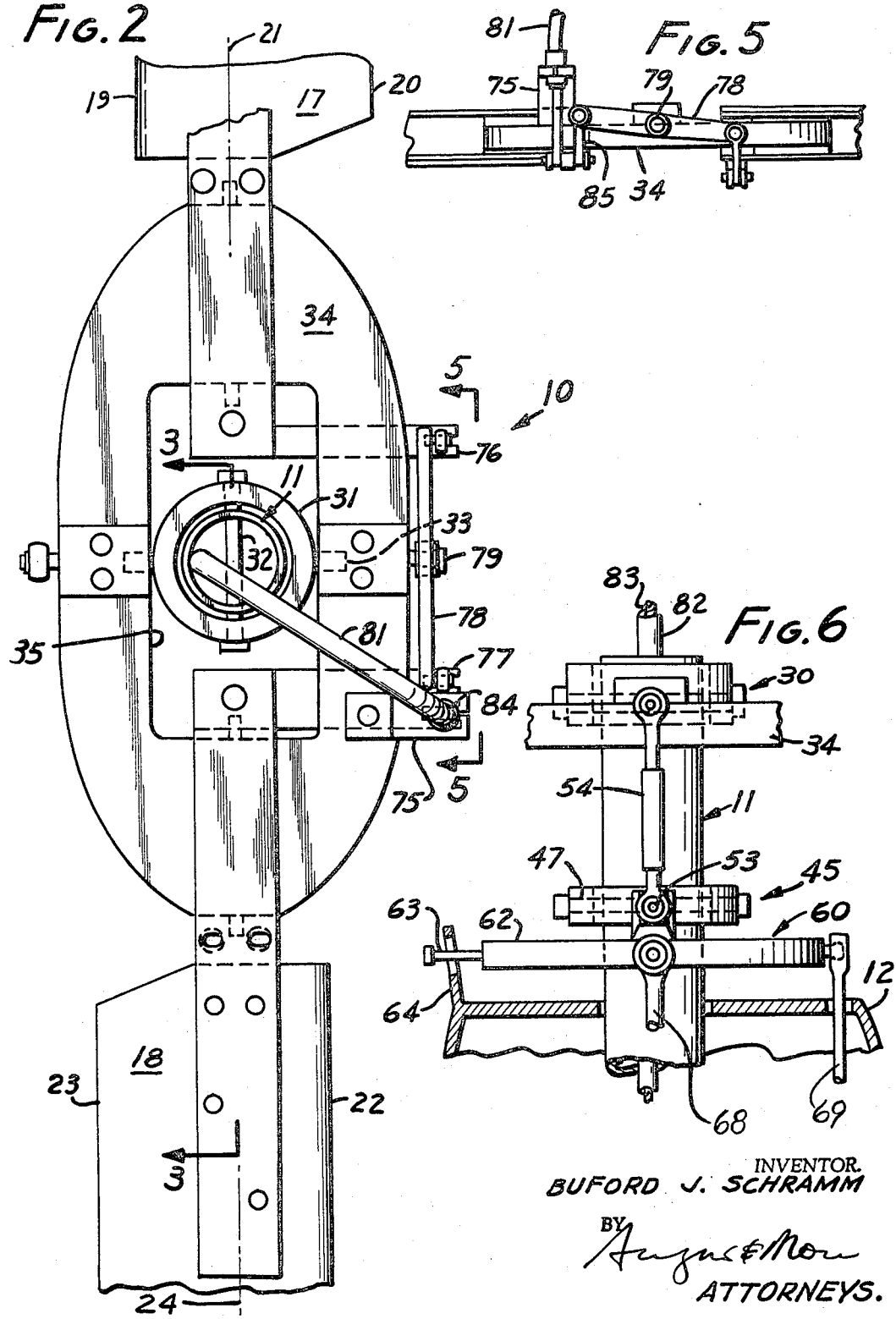

3,384,184
HELICOPTER ROTOR HUB
Buford J. Schramm, 115 N. Primrose,
Alhambra, Calif. 91801
Filed July 6, 1966, Ser. No. 563,141
3 Claims. (Cl. 170—160.26)

ABSTRACT OF THE DISCLOSURE

This invention relates to helicopters and, in particular, to a helicopter rotor hub of the see-saw type in which the cyclic control is derived from interactions between two axially spaced-apart parallel-running gimbal joints and in which the collective control includes an actuator mounted to a fully universally tiltable driven blade mount and connected to the blades, together with means for operating the said actuator.

SPECIFICATION

This invention relates to helicopters.

Because of those ones of its inherent properties which enable it to hover, to maneuver in close quarters, and to take off and land without runways, the use of the helicopter has steadily expanded. However, it has certain inherent disadvantages which limit its economic usefulness. Obviously, there are many fields for its use in which economics are no real object. For example, in military operations, or in the servicing of remote commercial installations, there may either be no alternative, or the alternatives may be intolerable. Similarly, sportsmen and executives may be able to afford the costs of operation and maintenance and also not require appreciable payloads.

A helicopter's market could be significantly expanded by several improvements. One such improvement would be an increase in payload relative to gross weight, which principally means reducing the gross weight. Another would be to reduce the price, which principally means reducing the complexity and number of parts in the mechanism, mainly in the hub. Still another would be to simplify the maintenance, operation and controls, again by reducing the number of parts and producing a control system which is inherently more stable than any presently available.

The control of a rotary wing aircraft relate to (1) the pitch of the blades to determine the lift—this being customarily called the collective control, and (2) the orientation of the plane of rotation of the blades so as to determine the direction the aircraft is to fly. This is sometimes called the cyclic control. These two controls are correlated, because both are derived from the orientation of the blades. The prior art is replete with examples, usually of increasing complexity, of attempts to accomplish these control functions.

It is an object of this invention to reverse the present trend to complexity, to reduce the weight and complexity of the hub, and to improve the reliability and the response of the controls. Such objects can only result in a less expensive helicopter with a more favorable payload versus gross weight ratio and with operating, maintenance, and purchase economies.

This invention utilizes and simplifies the "see-saw" type of rotor hub. It utilizes and controls the orientation of the plane of rotation and of the pitch angle of two aligned blades.

Each of the blades has a leading edge, a trailing edge, and a pitch axis around which the blade is rotatable to vary the angle of attack of the blade. A drive shaft has a generally upright axis of rotation relative to the frame of the aircraft. A blade mount is adapted to support the blades for rotation around the axis of rotation and also around the pitch axis. A first gimbal joint mounts the blade mount to the drive shaft so that it is universally tiltable and is drivingly connected to the drive shaft. The blades are mounted to the blade mount and share its motions.

A bearing with an inner and outer race surrounds the drive shaft. A pair of bidirectional bearing-tilt elements is connected to one of these races and to a cyclic control element such as a universally mounted joystick, or a wobble plate operated by a joystick. The bearing-tilt elements are angularly spaced apart around the axis of rotation so as to tilt the bearing universally. A follower is attached to the other of the races for rotation parallel to the plane of the bearing.

A second gimbal joint universally tiltably mounts the follower to the drive shaft and also drivingly attaches it thereto. A link joins the follower and the blade mount at a position on the blade mount 90° displaced from one of the blades.

A pitch horn is connectible to each blade for turning the blade around its pitch axis. An actuator is carried by the blade mount for moving the pitch horn. Operating means is provided for operating the actuator, such as a collective control stick.

According to a preferred but optional feature of the invention, the actuator comprises a flexible push-pull cable, and the operating means may be such as a collective control stick, the cable passing through a passage in the drive shaft.

The above and other features of this invention will be fully understood from the following detailed description and the accompanying drawings, in which:

FIG. 1 is a side elevation of the presently preferred embodiment of the invention, shown partly in cutaway cross-section;

FIG. 2 is a top view of FIG. 1;

FIG. 3 is a cross-section taken at line 3—3 of FIG. 2;

FIG. 4 is a cross-section taken at line 4—4 of FIG. 1;

FIG. 5 is a side elevation taken at line 5—5 of FIG. 2; and

FIG. 6 is a left-hand elevation of FIG. 1 partly cut away.

The invention can best be initially understood by reference to FIGS. 1 and 2. FIG. 1 shows hub 10 according to the invention which includes a tubular drive shaft 11 mounted to the frame 12 of a helicopter by a thrust bearing 13. Upward lift on the aircraft is derived from an upward pull on the axis 14 of the drive shaft, and this axis is generally vertically oriented to the aircraft. The drive shaft is driven by a drive gear 15 which is drivingly engaged to a motor 16.

Now with reference to FIG. 2, it will be seen that there is a pair of blades 17, 18 which are aligned with each other and are oppositely directed. Blade 17 has a leading edge 19, a trailing edge 20, and a pitch axis 21. Blade 18 has a leading edge 22, a trailing edge 23, and a pitch axis 24. The pitch axes lie in a common plane and, as can best been seen in FIG. 3, form an angle (180° minus $2a°$) with each other so as to form a cone when the rotor turns. When these blades rotate, they rotate in what is commonly called "a plane of rotation" which may obviously be slightly conical. $a°$ is ordinarily numerically very small, on the order of about 1°.

The object of the drive shaft is to rotate the blades and derive lifting force from them and to support the elements which control the pitch of the blades and the attitude of their plane of rotation.

A first gimbal joint 30 is disposed near the top of the drive shaft and surrounds the same. It includes a gimbal element 31 in the form of a ring which fits around the drive shaft with a clearance therebetween. A first journal 32 comprising a shaft in the nature of a bolt passes through the drive shaft closely engaged by the same, and through the gimbal on an axis normal to the axis 14 of the drive shaft. A second journal 33 comprising a pair of stub shafts mounts a blade mount 34 to the drive shaft. The stub shafts comprising the second journal are aligned. Their common axis lies normal to the axis of the first journal, and they serve to connect the blade mount to the drive shaft so that it is universally tiltable, and is also driven by the drive shaft.

The blades are attached to the blade mount as best shown in FIGS. 2 and 3, wherein the mounting of only blade 18 is shown in detail, it being understood that blade 17 is mounted in the same way, except that it faces in the opposite direction. The blade mount has a slot 35 in its center to clear the drive shaft and gimbal element 31 in all operating positions. A pair of straps 36, 37 are attached to the top and bottom, respectively, of blade 18 and straddle the blade mount. In the slot there is placed a thrust block 38 to which the straps are attached. A thrust bearing 39 in block 38 permits rotation of the blade around its pitch axis 24. A bearing block 40 is similarly supported between the straps at the outside of the blade mount, and supports a bearing 41. With this arrangement, the blade can be driven by the blade mount and is also rotatable around its pitch axis, the straps having a sufficient clearance from the blade mount to permit rotation around the pitch axis. It will be noted that the axes of bearings 39 and 41 are aligned with axis 24, and not with the plane of the blade mount. The blade assembly, including blocks, straps, and blades, is held together by bolts as shown.

It will now be seen that with the blades at any angular orientation on their pitch axis, they as an aligned single group can be tilted by tilting the blade mount, and it will evidently be a control function of the cyclic control to tilt the blade mount in order to determine the direction in which the aircraft is to fly. This control structure will now be described.

Aligned with the first gimbal joint and spaced below it is a second gimbal joint 45. It includes (FIG. 4) a gimbal element 46 in the nature of a ring surrounding and spaced from the drive shaft. This ring is held to the drive shaft by a first journal 47 in the nature of a bolt which passes through and is engaged by the drive shaft, and also by the gimbal element. A second journal 48 in the nature of a pair of aligned stub shafts projecting from the gimbal element fits in a follower 49, which follower is in the nature of a first and second block 50, 51. Block 50 includes a stub shaft 52 projecting laterally relative to axis 14. The stub shaft bears a ball joint 53 engaged to a rigid push-pull link 54 that, in turn, is joined to the blade mount by another ball joint 55. These ball joints provide for universal angular motion around their respective centers. The orientation of the plane of rotation of follower 49 will determine the angle or plane of blade mount 34 while they rotate together around the same axis.

The angular position of the follower is, in turn, determined by the plane of rotation of a bearing 60 having an inner race 61 and an outer race 62. One of these races, preferably the outer race, is held against rotation (FIG. 6) by a stub shaft 63 attached to the outer race and held against rotation by a bracket 64 which forms part of the frame. A slot 65 receives shaft 63 and permits universal tipping of the bearing, but without rotation of the outer race. The inner race is attached to first and second blocks 50, 51 by bolts 66, 67, respectively. Therefore, as bearing 60 is tipped, and the drive shaft rotates, the plane of rotation of the follower will be parallel to the plane of rotation of bearing 60, and, in turn, the follower adjusts the blade mount so as to be parallel to its own plane.

The plane of rotation of bearing 60 is, in turn, determined by the cyclic control of the aircraft. In the presently preferred embodiment as shown in FIGS. 1 and 6, this comprises a pair of cyclic control elements 68, 69, which are angularly spaced apart from each other around the axis 14, each of which is attached to the outer race by a respective ball joint of the same nature as ball joints 53 and 55. The cyclic control elements 68 and 69 are push-pull devices, preferably rods, which are controlled by the pilot from a universally tiltably controllable joystick. The upward and downward motions of elements 68 and 69 determine the angular orientation of the plane of rotation of bearing 60 and of the hub plate.

It will be noted that the rigid link 54 is 90° out of phase with the blades. This is for the reason that the blade assembly, when whirling, operates as a gyroscope and in order to have the blade plane assume the desired position, it is necessary for the control effort to be applied 90° out of phase with the desired effect. Therefore, in FIG. 2, pulling downwardly on the link in the position illustrated will have an effect 90° later. The way in which this operates is, for example, by pulling downwardly on the link at this orientation, thereby to lower the angle of attack of leading edge 19, exerting a downward force on axis 21 which will cause an effect 90° out of phase therewith, and this force derived from the blade will cause the plane of rotation to assume the desired position.

The foregoing describes the construction, theory, and operation of the cyclic control which determines whether the aircraft goes straight up, or in some horizontal direction. There remains to be discussed that control generally known as the collective control which determines the pitch angle of the two blades to establish their component of upward force. Evidently the greater the angle of attack of blades 18 and 19, the greater the upward force. This is determined by the collective control which includes a bracket 75 attached to the blade mount, and a pair of pitch horns 76, 77, one attached to each of blades 17 and 18 (see FIG. 5). These pitch horns are, in turn, interconnected by a lever 78 that is pivotally mounted by an intermediate pin 79 to the blade mount. It will now be seen that if lever 78 is turned so that its left-hand end in FIG. 5 goes up and right-hand goes down (or vice versa), the rotations of the two blades around their respective pitch axes will be equal and opposite. Because they are 180° out of phase, their changes of angles of attack will be in the same sense. Therefore, rotating lever 78 will cause an appropriate change in pitch of both of the blades. In order to accomplish this function, an actuator 80 is provided which in its simplest embodiment is a push-pull flexible cable 81 including a sheath 82 and an axially movable element 83 in the nature of a flexible wire or cable which does not change its length, but which can axially be shifted within the sheath. The sheath is held to bracket 75 by a nut 84. The element 83 is attached to pitch horn 77, which pitch horn is, in turn, mounted by link 85 to lever 78. It will now be seen that shifting the element 83 within its sheath will change the length of this element which protrudes beyond the sheath (or bracket), which for convenience is illustrated as dimension "B." This, in turn, changes the pitch of both of the blades.

This effect is achieved by operating means, which in the simplest form will be a collective stick 86 (see FIG. 1) which is pivotally mounted to the frame. Bearings 87, 88, respectively mount the sheath and element 83 of flexible cable 81 so that they can rotate with the drive shaft. Bearing 88 is a thrust-type cable which will move the element 83 relative to the sheath when the collective stick is moved in the direction indicated by arrow 89. The bearings are mounted to frame, bearing 87 directly thereto, and bearing 88 through the mounting of the collective stick.

The operation of the aircraft is straightforward. Assuming that the aircraft is to take off vertically, then the cyclic control is set so that the plane of rotation of bearing 60 is horizontal, and the collective stick is set so that the pitch of the two blades is such as to give the desired lift. Then the motor is started in rotation and the blades develop their thrust vertically, axially, and the aircraft takes off. Should it be desired to climb faster or slower, then the pitch can be changed by changing the position of collective stick 86.

Actuator 80 is shown in its simplest form. However, it is evident that the only control function required is to change the position of the pitch horns, and this could be done by rack and gears between the pitch horn linkage and the blade mount, or by gears and pinions, or by servomotors and the like. Furthermore, instead of a direct connection as shown, remotely controlled servo motors, or servo loops, and the like might be used to establish this position. However, the flexible cable is at once simple, easy to install, service and to inspect and is also very light in weight. It contributes greatly to reducing the expense and complexity of this aircraft.

Now to control the direction in which the aircraft is to take, it is only necessary to operate the cyclic control so as to adjust the relative positions of cyclic control elements 68 and 69 to tilt the plane of bearing 60 in the direction which the aircraft is desired to take. It is noted that this effect will be exerted 90° out of phase both to the plane and to one of the blades because of the position of link 54. This is because the forces needed to overcome the inertia of the system are too great to be derived directly from the stick. Instead, a slight force exerted on the blade mount can cause the blades as a unit to be tilted, one increasing its pitch and the other decreasing its pitch as desired, a very small such tilt thereby causing a very substantial force to be exerted by the blades themselves on their own system which will cause the plane to be tilted 90° out of phase. Therefore, when the aircraft is flying at any but a vertical direction or hovering, there will be a steady cycling of the blades in a known manner derived from the control function of following the plane of the bearing 60. This is all the flying this aircrfat requires, and it will be seen that it is accomplished with extremely simple mechanical devices which are readily manufactured, inspected and maintained and which are very light in weight, especially as compared to previously known constructions, thereby achieving the aforesaid objects of this invention.

This invention is not to be limited by the embodiment shown in the drawings and described in the description which is given by way of example and not of limitation, but only in accordance with the scope of the appended claims.

I claim:

1. In a helicopter having two blades, which blades have a leading and trailing edge and a pitch axis, and a frame having mounted thereto a collective pitch control element for determining the angularity of the blades around the pitch axis, and a cyclic control element for determining the inclination of the plane of rotation of the said blades, thereby to establish a direction of control, a hub comprising: a drive shaft having a generally upright axis of rotation relative to the frame; a fully universally tiltable blade mount drivenly mounted to the drive shaft to which blade mount, said blades are mounted for rotation around the said axis of rotation, and also around their respective pitch axes, which pitch axes are obliquely oriented relative to said axis of rotation; a first gimbal joint including a first journal drivingly connected to the drive shaft and normal to the axis of rotation and a second journal drivingly connected to the blade mount and normal to the first journal, and a gimbal element drivingly and rotatably mounted to both journals, whereby the blade mount is drivingly engaged to the drive shaft, and the plane of rotation of the blades is universally tiltable relative to the drive shaft; a bearing having an inner and an outer race surrounding said drive shaft; a pair of bidirectional bearing-tilt elements connected to one of said races and to the cyclic control element, said bearing-tilt elements being angularly spaced apart around the axis of rotation; a follower attached to the other of said races for rotation in the plane of the bearing; a second gimbal joint including a first journal drivingly connected to the drive shaft and normal to the axis of rotation and a second journal drivingly connected to the follower and normal to the last-named first journal, and a gimbal element drivingly and rotatably mounted to both of said last-mentioned journals, whereby the follower is constrained to rotation in a plane parallel to that of the bearing; a link joining the follower and the blade mount at a position 90° displaced from a selected control alignment; a pitch horn connectible to each blade for turning the same around its pitch axis; a lever pivotally joined to the blade mount and to each of the pitch horns to maintain the blade pitch angles equal to each other; actuator means mounted to said blade mount, which actuator means includes extensible means interlinking the blade mount and the blades, which, when said extensible means are extended or retracted, causes rotation of the blades around their respective pitch axes; and operating means for operating the actuator means, the said actuator means being the sole control relating the pitch angle of the blades to the blade mount, the system including the link having no effect thereon.

2. Apparatus according to claim 1 in which the actuator means comprises a flexible push-pull cable including a sheath attached to the blade mount and an internal axially shiftable element operatively connected to said blades.

3. Apparatus according to claim 2 in which the sheath is attached to the blade mount, and the axially shiftable element is attached to the lever.

References Cited

UNITED STATES PATENTS

| 2,262,613 | 11/1941 | Larsen | 170—160.33 |
| 2,427,939 | 9/1947 | Woods | 170—160.33 X |
| 2,604,174 | 7/1952 | Worrel | 170—160.34 X |
| 2,631,676 | 3/1953 | Hiller | 170—160.25 X |
| 2,969,117 | 1/1961 | Schon | 170—160.25 |
| 3,120,276 | 2/1964 | Culver et al. | 170—160.25 |
| 3,132,697 | 5/1964 | Cheesman et al. | 170—160.26 X |
| 3,213,944 | 10/1965 | Nichols et al. | 170—160.26 X |
| 3,227,220 | 1/1966 | You | 170—160.13 |
| 3,288,395 | 11/1966 | Krohncke | 170—160.52 X |

EVERETTE A. POWELL, JR., *Primary Examiner.*